(12) United States Patent
Perez et al.

(10) Patent No.: US 7,486,828 B2
(45) Date of Patent: Feb. 3, 2009

(54) METHOD AND APPARATUS FOR PROCESSING AN IMAGE DATA FOR OUTPUT

(75) Inventors: Ricardo Martinez Perez, Plantation, FL (US); Shimon Goldstein, Coral Springs, FL (US); Hung Q. Vuong, Margate, FL (US)

(73) Assignee: Motorola, Inc., Schaumburg, IL (US)

( * ) Notice: Subject to any disclaimer, the term of this patent is extended or adjusted under 35 U.S.C. 154(b) by 745 days.

(21) Appl. No.: 10/994,564

(22) Filed: Nov. 22, 2004

(65) Prior Publication Data

US 2006/0110053 A1  May 25, 2006

(51) Int. Cl.
*G06K 9/36* (2006.01)
*G06K 9/46* (2006.01)
(52) U.S. Cl. .................... 382/232; 382/233; 382/236; 382/245; 382/250; 382/251; 375/240.01; 375/240.16; 375/240.29
(58) Field of Classification Search ......... 382/232–233, 382/234, 236, 238, 240, 244, 245, 250, 251; 348/384.1, 420.1, 439.1, 440.1; 375/240.01, 375/240.16, 240.29
See application file for complete search history.

(56) References Cited

U.S. PATENT DOCUMENTS

| 4,943,865 | A  | * | 7/1990 | Hales et al. ............... 386/112 |
| 7,076,104 | B1 | * | 7/2006 | Keith et al. ............... 382/233 |
| 2005/0041875 | A1 | * | 2/2005 | Yamaguchi et al. ......... 382/233 |
| 2005/0053290 | A1 | * | 3/2005 | Wada et al. ............... 382/233 |
| 2006/0094466 | A1 | * | 5/2006 | Tran ...................... 455/558 |
| 2006/0104603 | A1 | * | 5/2006 | Worry et al. .............. 386/46 |

* cited by examiner

*Primary Examiner*—Matthew C Bella
*Assistant Examiner*—Ali Bayat

(57) ABSTRACT

A technique of processing an image data for output on a digital image device that compresses (164) a portion of a received image data to a data frame (110) according to a predefined size that is optimized for output with a processor of the device. The portion of the image data that is defined by the data frame is outputted (166, 186) to another source, and for any empty bits in the data frame, a zero bit is inserted (174).

14 Claims, 7 Drawing Sheets

METHOD AND APPARATUS FOR PROCESSING AN IMAGE DATA FOR OUTPUT

TECHNICAL FIELD

This invention relates generally to an image output process on a digital image device.

BACKGROUND

In recent trends, cell phones packaged with a digital camera are becoming quite common. With the advancement in the communication network and the reduced size of the high resolution digital camera, camera cell phones are no longer limited to just low resolution images. Instead, it is becoming more common that camera cell phones are able to take, transfer, and transmit high resolution images and video images. In fact, it is not too far off when the camera resolution will be drastically increased from its current 110K (CIF) or 330K (VGA) pixels to as much as 10 million pixels. This increase in resolution, however, greatly affects both the bandwidth and the clock requirements for the camera port in the baseband processor. For example, because the current baseband processors simply cannot keep up with the fast changing camera resolutions and required bandwidth to work with these resolutions, they must be upgraded. This, in turn, increases the cost of the device and the time to market for these new cell phones.

Moreover, the significant resultant variation in clock ranges is impractical, since the clock rate is typically limited by the baseband processors. For example, a 1.3 megapixel camera typically requires a 54 megahertz (MHz) clock for 15 frames per second, a 4 megapixel camera requires approximately 131 MHz, and a 10 megapixel camera requires approximately 300 MHz. Although many cameras include an embedded Phase Locked Loop (PLL) that allows the baseband processor to provide a slower clock, the data rate and the pixel clock coming back from the camera are nevertheless directly tied to the camera resolution. Thus, even with the PLL and the baseband processor providing 27 MHz to the camera, the actual camera pixel clock could be as high as 300 MHz for a 10 megapixel camera.

Another significant challenge is the electromagnetic interference (EMI) that results when bringing a high 131 MHz for a 4 megapixel image or 300 MHz for a 10 megapixel image from the camera to the baseband or imaging co-processor, which makes the integration of high resolution cameras into a wireless device very difficult. The challenge is even greater for wireless devices that use a clam shell (or so-called flip) form factor. In order to solve this problem, one proposed method is to serialize the interface to reduce pin count and to reduce the EMI. This approach, however, does not address the high bandwidth requirements for 4 through 10 megapixel imagers, because using the serial interface with a 10 megapixel imager will require clock rates above 1 gigahertz.

Another proposed solution is to provide more memory in the camera to hold the entire compressed image. This solution, however, is very expensive, because the memory will increase the production cost of these devices. Another proposed solution is to provide a separate port like a static random access memory (SRAM) interface or serial interface that is added to extract the compressed data from the camera. This separate port, however, is not a workable solution, since it operates with the larger memory and sometimes increases the pin count between the baseband processor and the camera module, which causes more interference from the EMI. Even if the same camera port signals are reused to retrieve the compressed data, the protocol and timing between the compressed data and the viewfinder data are incompatible, and they do not match the existing processors. This makes pulling data out of the module difficult and sometimes impossible for a given platform.

BRIEF DESCRIPTION OF THE DRAWINGS

The above needs are at least partially met through provision of the output process of an image data and supporting method and apparatus described in the following detailed description, particularly when studied in conjunction with the drawings, wherein.

Figure 1:
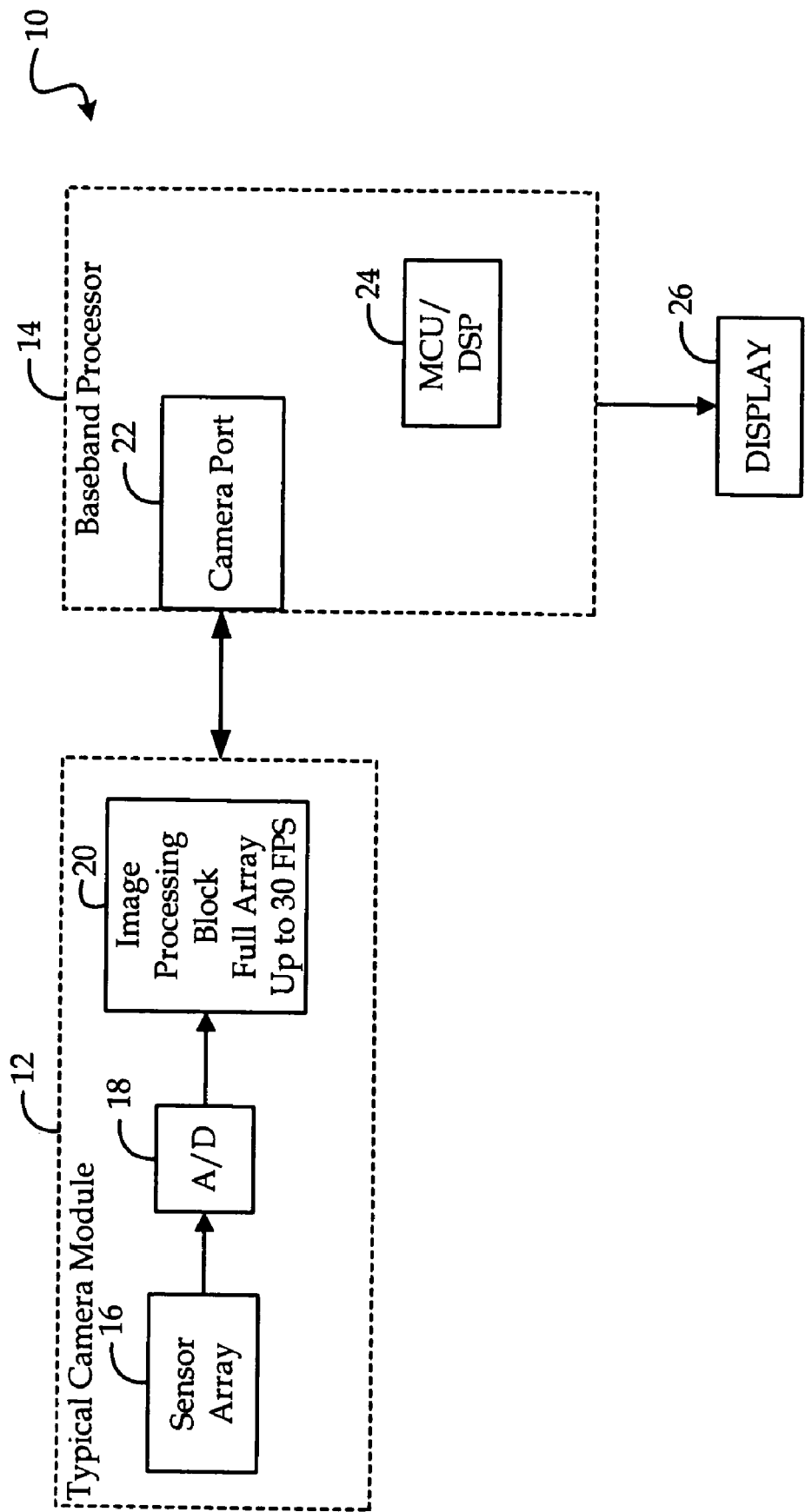
FIG. 1 comprises a block diagram of a prior art camera cell phone device.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a portion of received image data is compressed to a data frame of a predefined size that is optimized for output with a baseband processor. The compressed portion of the image data is then outputted. In one embodiment, this portion of the image is first buffered according to a fixed size of the buffer. Moreover, in another embodiment, if there is more than one data frame, the data frame is accordingly flagged to indicate that there is a next data frame.

According to various embodiments, the predefined size of the data frame is limited to a size that is compatible with an input port of a maximum pixel clock frequency of 60 megahertz. According to various embodiments, this predefined size is compatible with the timing of the International Telecommunications Union—Radiocommunications sector BT.601-2 or BT.656. For example, in one embodiment, the predefined size of the data frames are substantially of an equal size that is limited to a maximum of 5 megabytes. Alternatively, in another embodiment, the predefined size of a first data frame has a maximum of 2.58 megabytes, and the predefined size of a second data frame has a maximum of 2.62 megabytes.

In multiple embodiments, filler information can be included, which may be compressed to the data frame and outputted. In one embodiment, the filler information is buffered according to a fixed size of the buffer. After the image has been outputted in its entirety, in another embodiment, it is checked to determine whether there are empty bits in the last data frame. If so, a zero bit is inserted for any of the empty bits in the last data frame.

Such embodiments provide a cost effective way to accommodate a high resolution camera or video recorder without changing the timing of the external interface to the baseband processor, while keeping the EMI noise to a minimum. Although internally the camera module of the cell phone may have a digital signal processor (DSP) running at a much higher clock rate, the external interface to the baseband processor may remain constant at the same timing as the existing standard regardless of the camera resolution. As a result, the same interface with the same timing that is currently supported by a wide variety of baseband processors can be used. The baseband processor is not required to be changed or upgraded to accommodate these high resolution cameras or video recorder. Effectively, this will allow a processor with a maximum 60 MHz bandwidth, for example, to support as much as a 15 megapixel camera at 7.5 frames per second. Furthermore, the camera is no longer required to have any embedded memory for storing the entire image. Rather, a memory that has a capacity to buffer a few lines is sufficient, which will result in a significant cost reduction for the high resolution cameras or video recorders. Although various descriptions set forth below relate to implementations within camera cell phones, other implementations, such as a standalone camera or video recorder, a personal digital assistant with an embedded camera, or a component camera device, are contemplated. Moreover, the use of the term digital image device shall be understood to include a device that captures both still images and video images. As such, "image data" includes both data of still images and video images.

Referring now to the drawings, and in particular to FIG. 1, in the prior art, a typical camera cell phone is shown and indicated generally at 10. A camera module 12 is operably connected to a baseband processor 14 of the cell phone. In the camera module, a sensor array 16 is included for taking the image, which is outputted as analog data to digital-to-analog (A/D) converter 18. The A/D converter 18 converts the analog data to digital data for transfer to the image processing block 20. Generally, the image is processed at its full array, which can be as much as 30 frames per second. Once the entire image is processed in the camera module 12, the full array of the image data is transferred to the baseband processor 14 via a camera port 22. Through the baseband processor 14, which may include a microcontroller-digital signal processor (MCU/DSP) hybrid chip 24 as an example, the image is ultimately outputted either to a view finder on a display 26 of the device or as a file.

Figure 2:
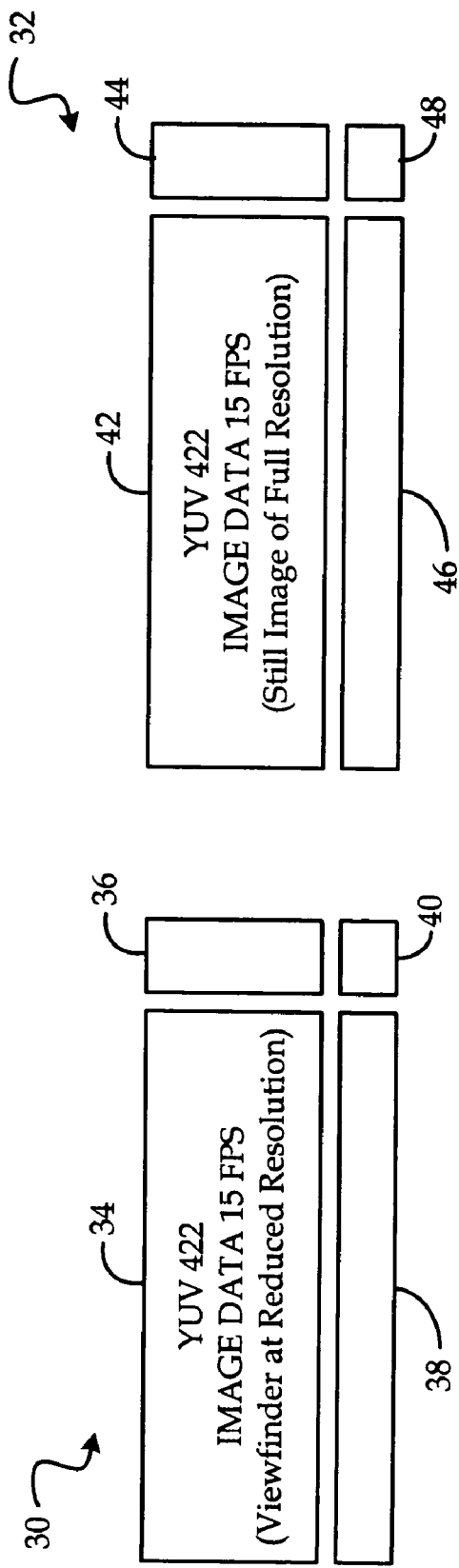
FIG. 2 comprises a prior art data structure of an image generally used in prior cell phone devices.

FIG. 2 shows prior art data structures of the image on a viewfinder 30 and as a still image 32 of a typical camera cell phone as shown in FIG. 1. As shown, the data structure of the image through the viewfinder 30 is generally at reduced resolution. Specifically, the entire image data on the viewfinder is outputted as a data block 34 at 15 frames per second using the YUV 422 specification. The YUV 422 is a specific encoding for digital representation of the YUV color space. YUV, also known as Y'CbCr and YPbPr, is a color space in which the Y stands for the luminance component (the brightness) and U and V are chrominance (color) components. The YUV is commonly used in video applications, and it is also referred to as component video. As with most typical data frames, the data block 34 is surrounded with a horizontal blanking interval 36, a vertical blanking interval 38, and a horizontal/vertical blanking interval 40. The horizontal blanking interval is the period in the image scanning where the row data is momentarily extinguished as it moves from right to left. During this period, the scanning can return unseen to scan another line. Similarly, the vertical blanking interval is an interval in between images that temporarily suspends transmission of the signal of the first line of the next image. These blanking intervals may also store synchronizing information of the image. Please note that image data may be unprocessed RGB Bayer data from the sensor instead of the YUV data.

Turning to the data structure of the still image 32, it similarly includes a data block 42 that captures the entire image at full resolution using the YUV 422 specification at 15 frames per second. This data block 42 similarly includes a horizontal blanking interval 44, a vertical blanking interval 46, and a horizontal/vertical blanking interval 48, which may also store the horizontal, vertical, and chrominance synchronizing information of the image. Using this data structure, the entire image is processed at the camera module before being outputted to the baseband processor using the camera port. With higher pixel image resolution, larger data chunks are being transferred to the baseband processor, which may or may not be able to accept the data depending on its clock rate. As a result, the baseband processor must be upgraded to accommodate these higher pixel cameras that are transferring large amounts of data in the same amount of time. However, this need to upgrade the baseband processor translates to higher production cost for these high resolution camera cell phones and a slower time to market.

Figure 3:
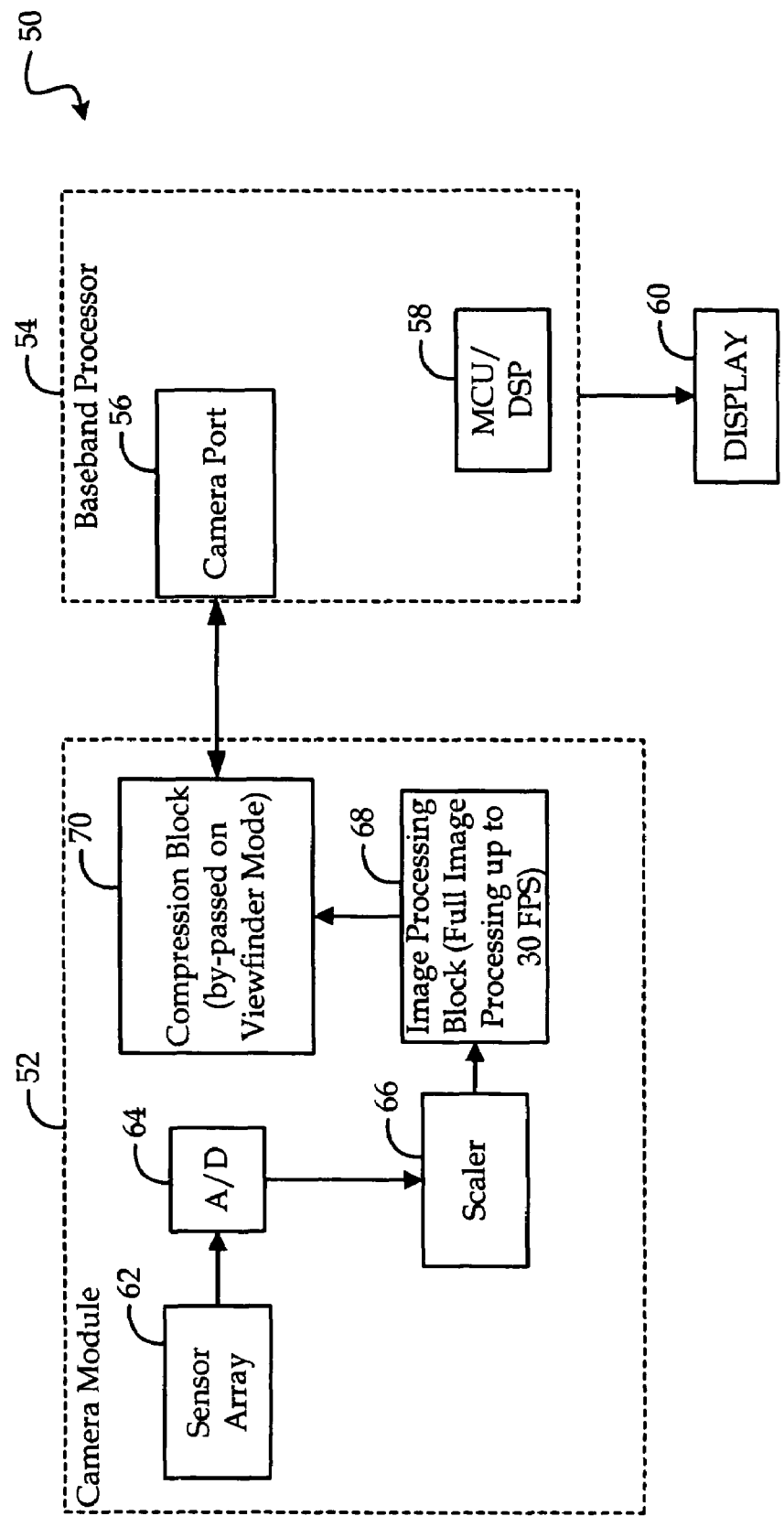
FIG. 3 comprises a block diagram of a camera cell phone device as configured in accordance with various embodiments of the invention.

Turning now to FIG. 3, a block diagram of a camera cell phone device as configured in accordance with various embodiments of the invention is shown and indicated generally at 50. As shown, a camera module 52 is included for capturing the image, while a baseband processor or an image controller 54 is included for outputting the captured image. The baseband processor includes a camera port 56 for receiving the captured image from the camera module and a MCU/DSP hybrid chip 58 for processing the output of the captured image, which can be outputted to a display 60 on the camera phone itself. Of course, various teachings contemplate and include outputs to any other devices, such as another mobile device, a computing device, or a peripheral device. Since one of the many benefits of the various teachings provided is that the baseband processor is not necessarily changed in order to accommodate a higher resolution camera module, any type of baseband processor can be used with various embodiments shown.

The camera module 52 includes similar prior art components, such as a sensor array 62 for capturing the image as analog information, an A/D converter 64 for converting the analog information to digital information, a scaler 66 for scaling, decimating, or cropping the image, and an image processing block 68 for color processing the image at 30 frames per second as one example. This embodiment differs from the prior art in that a compression block 70 is provided to process the image data from the image processing block 68 before being forwarded to the camera port 56 of the baseband processor while maintaining timing compatible with existing processors. Specifically, the compression block 70 formats the data from the image processing block 68 for outputs that are optimized to the clock rate of the baseband processor 54. Thus, substantially all data from the camera modules can pass through the compression block 70 for processing, since it is the only component directly connected to the camera port in this embodiment. The compression block is by-passed (e.g., optionally skipped) on viewfinder mode since typically the scaler provides an image of less than 330K pixels (e.g., reduced resolution for the viewfinder) transferred on viewfinder mode. As a result, there is no need to compress the stream. The compression block 70 in the various embodiments ensures that data going to the camera port 56 is formatted according to a data format and/or size that is optimized for the capacity of the baseband processor. As a result, the camera module can handle any type of output clock rate, while at the same time, accommodating higher resolution image captures at internally higher frequencies.

Figure 4:
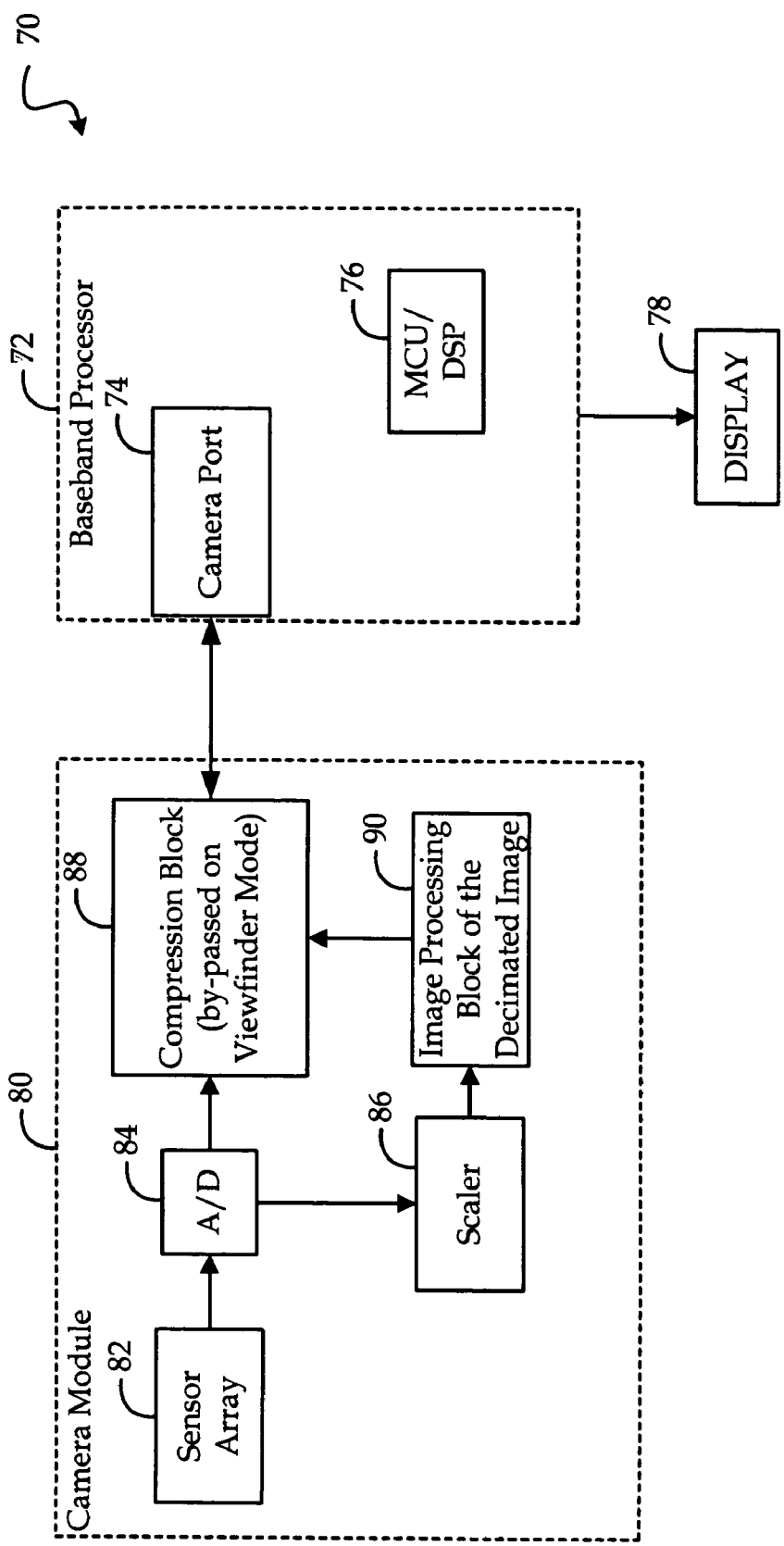
FIG. 4 comprises a block diagram of another camera cell phone device as configured in accordance with various embodiments of the invention.

Turning now to FIG. 4, a block diagram of another camera cell phone device according to various embodiments is shown and indicated generally at 70. In this embodiment, a baseband processor 72 is shown to include a camera port 74 and a MCU/DSP chip 76, which are all linked to a display 78 of the camera cell phone. The camera module 80, in this embodiment, also similarly includes a sensor array 82, an A/D converter 84, a scaler 86, and a compression block 88. In this embodiment, however, the A/D converter 84 is connected to the scaler 86 and the compression block 88. The A/D converter has two options. One option is to transfer the data to the scaler for processing if scaling is required. The scaler 86, in turn, transfers the scaled data to an image processing block 90 that processes the decimated data of the image. The decimated data of the image, which can be a large file depending on the resolution of the camera module, is then sent to the compression block 88 that reconfigures the data for output to the baseband processor 72 via the camera port 74. To lower the camera module cost, image processing block 90 may be designed so that it has the capacity needed to only process scaled images used for the viewfinder. The full resolution image when captured may be required to be color processed on the baseband processor in this case. The cost, complexity, and power consumption of the image processing block 90 is reduced if it is designed only to operate on the reduced resolution viewfinder images.

If scaling of the image is not required, it can be transferred directly from the A/D converter to the compression block 88 for processing. In this embodiment, a separate image processing block may not be necessary, since the digital data of the image can be processed in small portions at a time through the compression block or within the baseband processor. For example, as the sensor array 82 can send a portion of the image to the A/D converter 84 as the image is being captured, the portion of the image can then be simultaneously transferred to the compression block 88 for processing and outputted to the camera port 74 in small portions at a time. In this case, the camera module 80 is not required to have an embedded memory that can hold the entire data frame of the image. Instead, the memory required of the camera module may be just large enough for storing only a few lines of data at a time. Moreover, since smaller portions of the data are being outputted to the camera port, a higher clock rate of the baseband processor 72 is not necessary. As a result, this configuration reduces the cost for the camera device in the cell phone, while enabling a high pixel camera module to be implemented with the existing available baseband processor.

Figure 5:
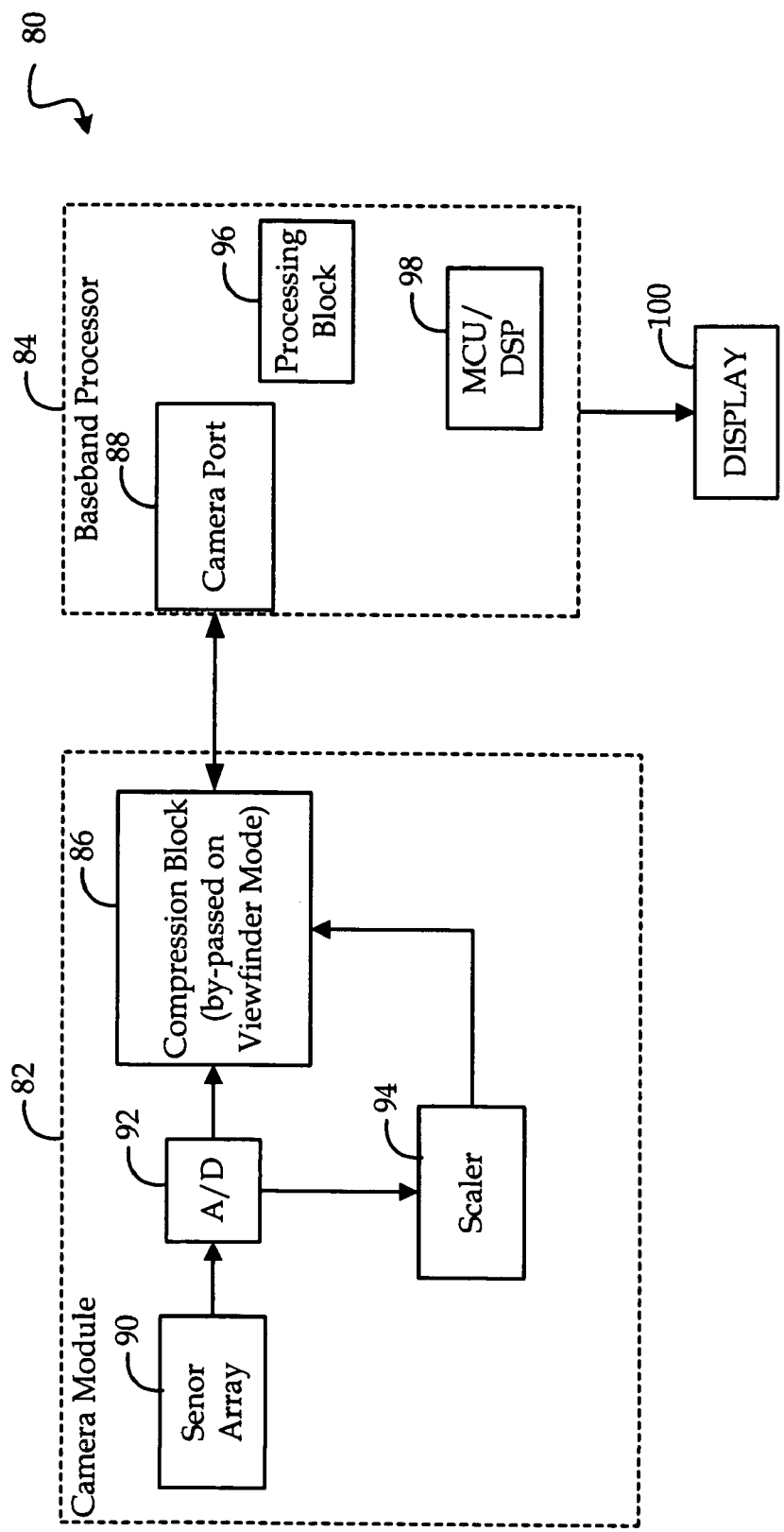
FIG. 5 comprises a block diagram of yet another camera cell phone device as configured in accordance with various embodiments of the invention.

Referring now to FIG. 5, the embodiment of not implementing a separate image processing block is shown and indicated generally at 80. Similar to the previous embodiments shown, a camera module 82 and a baseband processor 84 are connected. Specifically, a compression block 86 from the camera module 82 is connected to a camera port 88 from the baseband processor 84. The camera module 82 also includes a sensor array 90, an A/D converter 92, and a scaler 94. In this embodiment shown, since the camera module 82 does not include a separate image processing block, the A/D converter 92 and the scaler 94 are both directly connected to the compression block 86. In this embodiment, because the compression block buffers only a few lines at a time, the full array of the image is not processed in its entirety in a single process. Rather, the image data is compressed and outputted by the compression block 86 to the camera port in small portions at a time. Once a portion of the image is in the baseband processor 84, an optional processing block 96 and a MCU/DSP chip 98 is used to output the data to another source, such as a display 100 shown.

Figure 6:
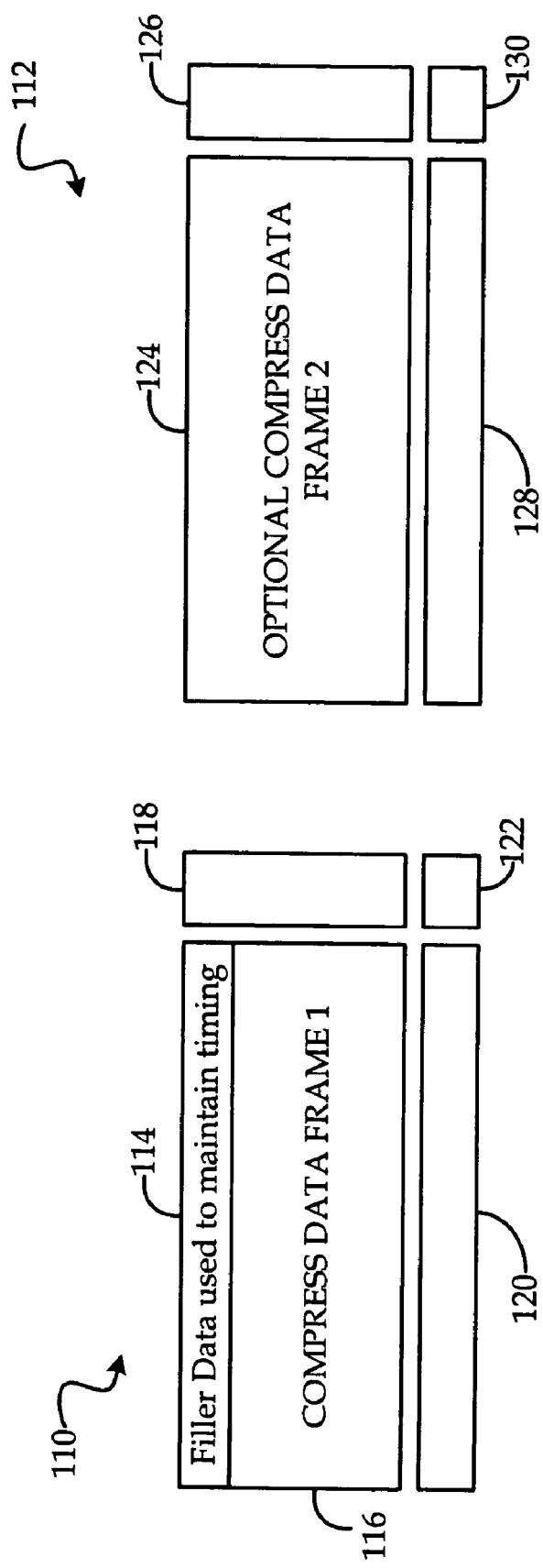
FIG. 6 comprises a data structure of an image as configured according to various embodiments of the invention.

Turning now to FIG. 6, a data structure of a first and second data frame used according to various embodiments is shown and indicated respectively at 110 and 112. The first data frame 110 includes optional filler data 114 in the first few bytes of the frame. Although filler data is not required, this information may be useful for configuration or maintaining the output timing of the frame. The digital data of the image itself are compressed into a data block 116 of the frame following the data bits of the filler data 114. Since this is a data frame relating to images, the first data frame 110 similarly includes a horizontal blanking interval 118, a vertical blanking interval 120, and a horizontal/vertical blanking interval 122 around the data block of the image and filler information. Depending on the size of the image, if the data of the image cannot be captured in a single frame, the second optional data frame 112 can be used to receive the remaining portions of the image. The second data frame 112 similarly includes a data block 124 for storing the image data, a horizontal blanking interval 126, a vertical blanking interval 128, and a horizontal/vertical blanking interval 130.

The first 110 and second 112 data frames are configurable according to sizes that are optimized for the baseband processor of the device, image resolution, and desired pixel clock rate, which is ultimately the output source. Optimized data frame size includes any memory size that can be used with the input and/or output capacity of the baseband processor, which would varied depending on the configuration of the baseband processor. Both data frames can have the same size or different sizes. In one embodiment, the predefined size of the data frame is defined for compatible timing of the International Telecommunications Union-Radiocommunications sector BT.601-2 or BT.656 specifications. Again, compatible predefined size of data frame refers to any size that can be used with the baseband processor. In another embodiment, the predefined size of the data frame is defined such that it is limited to a size that is compatible with an input port of a maximum pixel clock frequency of 60 MHz, since this is currently the standard clock rate of the baseband processors. This 60 MHz clock rate standard, however, would likely change in the near future because other faster baseband processors are already becoming more common. As a result, the various embodiments include any clock rate that is currently available, and it would be impractical to provide the optimized predefined size of the data frame. Nevertheless, since these various predefined size can be readily appreciated by a skilled artisan, they are within the scope of the invention. With the 60 MHz baseband processor, the predefined size of the first and second data frames is set at a maximum of 2.58 megabytes and 2.62 megabytes, respectively. In another embodiment, the first and second data frames are substantially of an equal size that is limited to a maximum of 5 megabytes.

Figure 7:
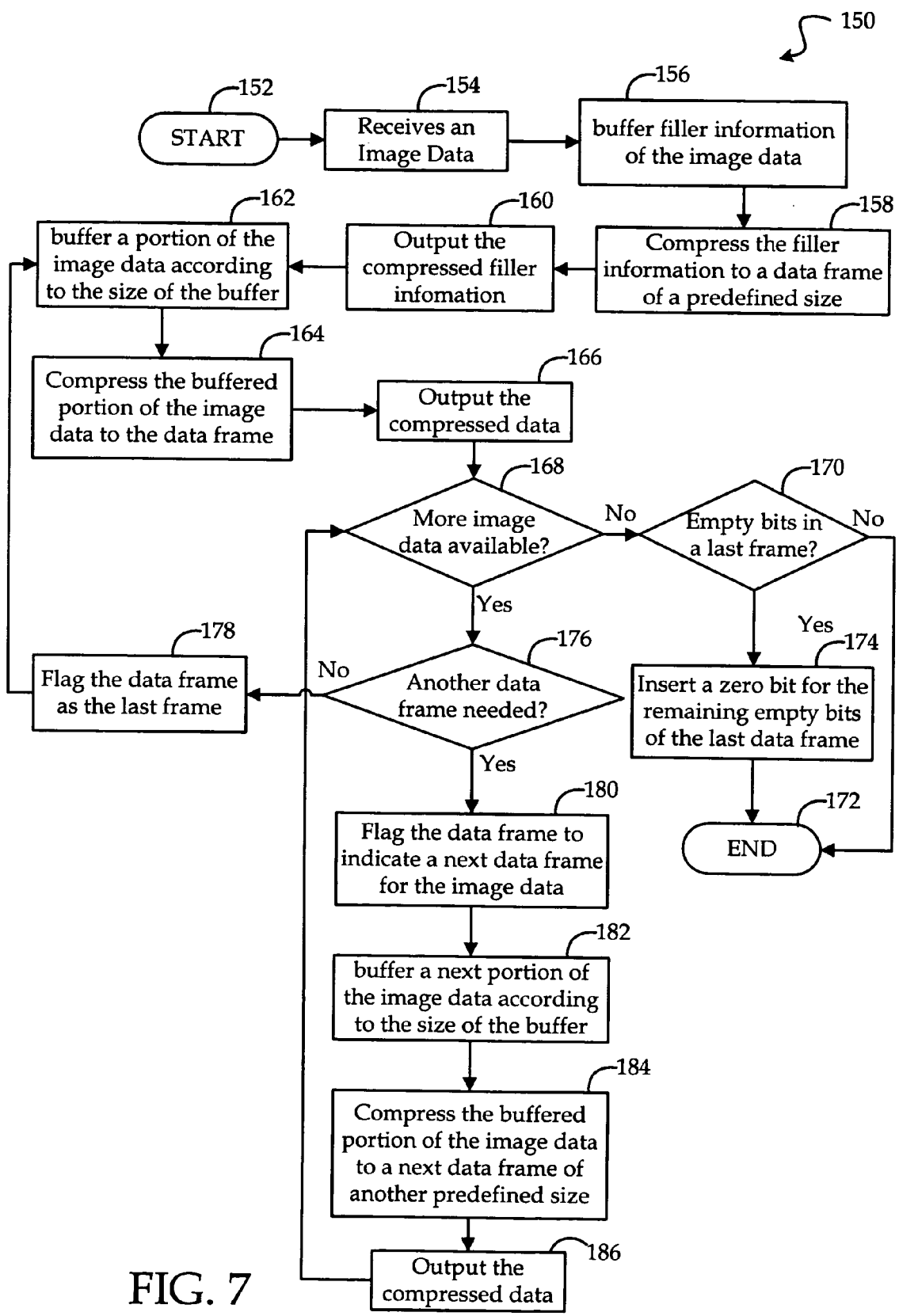
FIG. 7 comprises a flow diagram process according to various embodiments of the invention.

Turning now to FIG. 7, a flow diagram of a process according to an embodiment of various teachings is shown and indicated generally at 150. The process is initiated 152 by receipt 154 of an image data from a module within the device, such as the A/D converter shown, for output to another source. Please note that the entire image data is generally not received at one time. Rather, a portion of the image data is received from the A/D converter and processed one at a time on a continuous loop. Thus, as shown, the step of receiving 154 the image data occurs in parallel with the entire process. In response to receiving 154 the image data, filler information of the image data is buffered 156 to a buffer of a fixed size and compressed 158 to a data frame of a predefined size. The filler information can contain any type of information that may be relevant to this data frame or the image data, such as configuration information, security information, or timing information relating to the output of the data frame. In this embodiment, the data is outputted 160 to another source after being compressed. As a result, it is not required for the image data to be buffered or processed in its entirety. Instead, the filler data or portion of the image data are compressed and outputted simultaneously to avoid the requirement of a large memory in the device.

After the filler information has been compressed 158 and outputted 160, a portion of the image data is buffered 162 according to the fixed size of the buffer and compressed 164 to the data frame of the predefined size. As before, the compressed data are outputted 166 immediately, in this embodiment. It should be noted, however, there are embodiments that do not output the data until the entire image is compressed. Moreover, the portion of the image data can actually be the same size of the image data being received, depending on the predefined size of the data frame. The preference of these various embodiments greatly depends on the needs and configuration of the implementation, which is easily appreciated by one skilled in the art. As a result, other variations of this process are contemplated and are within the scope of the invention.

Next, it is checked to determine 168 whether there are more image data that are available for output. If not, which indicates that the entire still image or the video sequence has been outputted, it is determined 170 whether the last frame, in this case this would be the same as the first data frame, has any empty bits. If there are no empty bits in the data frame, the process ends 172 at this point since all the image data have been outputted. On the other hand, if there are empty bits in the last data frame, a zero bit is inserted 174 for each of these empty bits in the frame to minimize the noise from the EMI.

If, however, there are more image data available, it is determined 176 whether another data frame is needed for the image data. For example, in one embodiment, it is determined whether there are spaces available to compress the available image data in the first data frame. If so, the first data frame is flagged 178 as the last data frame, and the process loops back to buffer 162 and compress 164 the available image data. If, on the other hand, another data frame is needed, because the memory dedicated according to the predefined size of the first data frame has been utilized by the image data, a next data frame is needed. This is likely the case when videos or a high pixel still image are being outputted. In this case, the first data frame is flagged 180 to indicate that there is a next data frame for the image data. The next available image data are accordingly buffered 182 according to the fixed size of the buffer and compressed 184 according to another predefined size of the next data frame, which may or may not be the same predefined size of the first data frame. The compressed image data are then outputted 186, and the process loops back to check 168 for more available image data. This process is reiterated until the entire still image or video sequence has been outputted.

With these various teachings shown, a technique of processing image data for output has been provided. Through the various embodiments shown, a high resolution camera or video recorder is accommodated without changing the timing of the external interface to the baseband processor, and at the same time, the EMI noise is kept to a minimum while reducing the overall cost of the camera module. In other words, the camera module of the device can internally run a digital signal processor (DSP) at a much higher clock rate, but the external interface to the baseband process will remain constant at the same timing as the existing standard regardless of the camera resolution or the capacity of the video recorder. As a result, the same interface with the same timing that is currently supported by a wide variety of processors can be used, in place of providing a baseband processor that is specifically compatible with the camera module. Since the baseband processor does not need to be changed or upgraded, this will allow a baseband processor with a maximum 60 MHz bandwidth, for example, to support as much as a 15 megapixel camera at 7.5 frames per second. Moreover, the camera module no longer has to provide a separate embedded memory for storing the entire image. Instead, a memory that has a capacity to buffer a few lines is sufficient, which will result in a significant cost reduction on high resolution cameras. Furthermore, since the image processing block may be designed specifically for scaled viewfinder resolution images instead of full resolution images, the overall power consumption, cost, and complexity of the camera module are reduced, as a result. These and other benefits thus provide an output process of high resolution images that is both cost efficient and easy to implement with existing standards available.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for processing an image data for output on a digital image device comprising:

receiving the image data;

compressing a portion of the image data to at least one data frame of a predefined size wherein the predefined size of at least one data frame is selected so as to be optimized with and based at least in part upon at least one operating characteristic of a processor;

subsequently outputting the portion of the compressed image data defined by the at least one data frame to the processor;

at the processor, processing the compressed data to form processed data; and presenting the processed data on a display of the digital image device to a user.

2. The method according to claim 1, wherein prior to the compressing the portion of the image data further comprises:

buffering the portion of the image data according to a fixed size of a buffer.

3. The method according to claim 1 further comprising:

compressing filler information to the at least one data frame;

outputting the compressed filler information.

4. The method according to claim 3 wherein prior to compressing the filler information further comprises:

buffering the filler information according to a fixed size of a buffer.

5. The method according to claim 1 further comprising:
   determining whether there are empty bits in a last data frame of the at least one data frame when the image data has been outputted in its entirety;
   inserting a zero bit for any empty bits in the last data frame when there are empty bits in the last data frame.

6. A method for processing an image data for output on a digital image device comprising:
   receiving the image data;
   compressing a portion of the image data to at least one data frame of a predefined size, wherein the predefined size is optimized for output with a processor in the device;
   outputting the portion of the image data defined by the at least one data frame;
   determining whether another data frame is needed;
   compressing another portion of the image data to the at least one data frame when another frame is not needed;
   compressing another portion of the image data to a next data frame of the at least one data frame of another predefined size.

7. The method according to claim 6 further comprising:
   indicating on the at least one data frame that there is not a next data frame when another frame is not needed;
   indicating on the at least one data frame that there is a next data frame when another frame is needed.

8. The method according to claim 1, wherein the predefined size of the at least one data frame is limited to a size that is compatible with an input port of a maximum pixel clock frequency of 60 megahertz.

9. The method according to claim 1, wherein the predefined size of the at least one data frame is limited to a size that is compatible with an input port of a maximum operating frequency of a baseband processor.

10. The method according to claim 1, wherein the predefined size of the at least one data frame is defined for compatible timing of International Telecommunications Union —Radiocommunications sector BT.601-2 specification or International Telecommunications Union—Radiocommunications sector BT.656 specification.

11. An apparatus for processing an image data for output comprising:
    a module having an image data;
    a data compression unit operably coupled to the module and having at least one data frame of a predefined size comprising a compressed portion of the image data contained therein, wherein the predefined size of the at least one data frame is to be sent to a processor and wherein the predefined size is optimized and based at least in part upon at least one operating characteristic of the processor;
    an output operably coupled to the data compression unit and outputs the compressed portion of the image data to the processor.

12. The apparatus as defined in claim 11 further comprising: a buffer operably coupled to the module and the data compression unit and having the portion of the image data according to a fixed size to be compressed by the data compression unit.

13. The apparatus as defined in claim 11, wherein the data compression unit comprises a compressing means for comprising the compressed portion of the image data to the at least one data frame of the predefined size.

14. The apparatus as defined in claim 11 further comprising:
    an image processing block operably coupled to the data compression unit, wherein the image processing block is optimized for the capability of a viewfinder resolution.

* * * * *